United States Patent [19]

Maruhashi et al.

[11] 4,208,499

[45] Jun. 17, 1980

[54] DISPERSING STABILIZER FOR SUSPENSION POLYMERIZATION OF VINYL COMPOUNDS

[75] Inventors: Motokazu Maruhashi, Kusatsu; Yoshio Ebina; Kizo Ohnishi, both of Ogaki, all of Japan

[73] Assignee: Nippon Gohsei Kagaku Kogyo Kabushiki Kaisha, Osaka, Japan

[21] Appl. No.: 929,971

[22] Filed: Aug. 1, 1978

[30] Foreign Application Priority Data

Aug. 11, 1977 [JP] Japan ................................ 52-96730

[51] Int. Cl.² ........................... C08F 2/18; C08F 14/06
[52] U.S. Cl. ....................................... 526/202; 526/74; 526/200; 526/210; 526/344.2; 526/910
[58] Field of Search ................. 526/74, 200, 202, 910, 526/210, 344.2

[56] References Cited

U.S. PATENT DOCUMENTS

| | | | |
|---|---|---|---|
| 3,444,270 | 5/1969 | Aliberti et al. | 526/202 |
| 3,592,800 | 7/1971 | Oschmann et al. | 526/344.2 |
| 3,929,753 | 12/1975 | Itoh et al. | 526/344.2 |

FOREIGN PATENT DOCUMENTS 49-9488  1/1974  Japan .
49-53270 5/1974  Japan .

*Primary Examiner*—John Kight, III
*Attorney, Agent, or Firm*—Armstrong, Nikaido, Marmelstein & Kubovcik

[57] ABSTRACT

A dispersing stabilizer for suspension polymerization of vinyl compounds comprising (A) a water-soluble protective colloid and (B) a carbonyl group-containing polyvinyl alcohol having an average degree of hydrolysis of 10 to 90% by mole; the absorbance of a 0.1% by weight aqueous solution of the component (B) being not less than 0.18 at a wavelength of 280 mμ. Suspension polymerization of vinyl chloride can be conducted by using the stabilizer without adhesion of scale to a polymerization vessel, and also particles of the obtained vinyl chloride resins have a high porosity and uniform size.

6 Claims, No Drawings

DISPERSING STABILIZER FOR SUSPENSION POLYMERIZATION OF VINYL COMPOUNDS

BACKGROUND OF THE INVENTION

The present invention relates to a dispersing stabilizer for suspension polymerization of vinyl compounds, particularly vinyl chloride.

It is essential to employ various kinds of dispersing stabilizers in suspension polymerization of vinyl chloride or mixtures of vinyl chloride and other monomers copolymerizable therewith, and polyvinyl alcohols and cellulose derivatives have been employed as a dispersing stabilizer. Many kinds of polyvinyl alcohols have been proposed for the purpose, and it is known that the physical and chemical properties of polyvinyl alcohols such as an average degree of polymerization and average degree of hydrolysis exert a delicate influence upon the properties of vinyl chloride resins. However, in case of employing conventional polyvinyl alcohols singly, it is difficult to prepare polyvinyl chloride resins, particles of which have a uniform and high porosity. On the other hand, polyvinyl alcohols containing carbonyl group are known, and are commercially available under the registered trademark "Alcotex" made by Revertex Limited as a dispersing stabilizer for suspension polymerization of vinyl chloride. Japanese Patent Unexamined Publication Nos. 9488/1974 and 53270/1974 also disclose polyvinyl alcohols containing carbonyl group suited for use in the suspension polymerization. It is known that the production of coarse particles of vinyl chloride resins is decreased and also the particles of vinyl chloride resins have a proper porosity by the introduction of carbonyl group into polyvinyl alcohol. Also, according to the above Publication No. 9488/1974, the polyvinyl alcohols containing about 0.03 to about 0.15 % by mole of carbonyl group (namely an absorbance of a 0.1 % by weight aqueous solution thereof being 0.05 to 0.3 at a wavelength of 280 m$\mu$) are desirable as a dispersing stabilizer, and both of those having a carbonyl group content of less than 0.03 % by mole and of more than 0.15 % by mole are undesirable by the reasons that in case of the former, they have no effect, and in case of the latter, polyvinyl alcohol in itself is remarkably colored by the introduction of a large amount of carbonyl group.

Further, while these carbonyl group-containing polyvinyl alcohols have the advantage as mentioned above, it has become apparent, according to the investigation of the present inventors, that there are some problems as stated below, when they are employed singly as a dispersing stabilizer. (1) Vinyl chloride resins are lacking in sharpness of particle size distribution, (2) scale of vinyl chloride resins is easy to adhere to a polymerization vessel, and (3) large quantities of the dispersing stabilizer are required to keep the polymerization stability.

SUMMARY OF THE INVENTION

The present invention provides a dispersing stabilizer for suspension polymerization of vinyl compounds consisting essentially of (A) a water-soluble protective colloid and (B) a carbonyl group-consisting polyvinyl alcohol having an average degree of hydrolysis of 10 to 90 % by mole; the absorbance of a 0.1 % by weight aqueous solution of the component (B) being not less than 0.18 at a wavelength of 280 m$\mu$. The combination use of the components (A) and (B) makes up the defects seen in case of using each of the components (A) and (B) singly, and moreover brings excellent effects which cannot be expected from the single use of the component (A) or (B). Suspension polymerization of vinyl chloride can be advantageously carried out on an industrial scale by using the dispersing stabilizer of the invention.

DETAILED DESCRIPTION

The feature of the present invention lies in the use of (B) the polyvinyl alcohol containing carbonyl group in combination with (A) the water-soluble protective colloid.

When the suspension polymerization of vinyl chloride is conducted by employing the dispersing stabilizer of the present invention, excellent effects can be obtained as compared with the use of known conventional dispersing stabilizers, and the suspension polymerization of vinyl chloride can be industrially advantageously conducted.

(i) A particle of vinyl chloride resins has a high degree of porosity, and moreover the distribution of porosity between particles falls within a narrow range. As a result, it becomes easy to remove vinyl chloride monomer remaining in polyvinyl chloride particles.

(ii) With increase of the porosity of vinyl chloride resins particle, the distribution of the particle size becomes narrower. As a result, an absorption speed of a plasticizer becomes uniform and the particles melt homogeneously at the time of melt-molding. Therefore, even when a high-speed molding method is applied, molded articles having a little fish eye content can be obtained.

(iii) Adhesion of scale to a polymerization vessel can be nearly completely prevented.

(iv) The use of a less amount of the dispersing stabilizer of the present invention is sufficient for obtaining the same degree of effect as in the single use of a polyvinyl alcohol containing carbonyl group.

Polyvinyl alcohols, polyvinyl alcohol derivatives and cellulose derivatives are preferably employed as the water-soluble protective colloid (A) in the present invention. Polyvinyl alcohols are particularly preferred, and when polyvinyl alcohols having an average degree of hydrolysis of 60 to 95 % by mole and an average degree of polymerization of 100 to 3,000, particularly those having an average degree of hydrolysis of 65 to 90 % by mole and having an average degree of polymerization of 500 to 2,500 are employed, the above-mentioned effects (i) to (iv) are remarkably exhibited.

Examples of the polyvinyl alcohol derivatives employed as the water-soluble protective colloid (A) in the present invention are polyvinyl alcohols containing a relatively small amount of carbonyl group, the absorbance of a 0.1 % aqueous solution thereof being less than 0.18 at a wavelength of 280 m$\mu$, formalization, acetalization and butyralization products of polyvinyl alcohols, urethanated polyvinyl, alcohols, and esterfication products of polyvinyl alcohols with sulfonic acids or carboxylic acids. There may also be usable as the component (A) hydrolyzed copolymers of a vinyl ester and a monomer copolymerizable therewith, having a degree of hydrolysis in the vinyl ester units of 60 to 95 % by mole. Examples of the monomer copolymerizable with the vinyl ester are olefins such as ethylene, propylene, isobutylene, $\alpha$-octene, $\alpha$-dodecene and $\alpha$-octadecane, unsaturated carboxylic acids such as acrylic acid, methacrylic acid, crotonic acid and maleic acid and their salts and their alkyl esters, nitriles such as acrylonitrile and methacrylonitrile, amides such as acrylic amide and methacrylic amide, olefinic sulfonic acids such as ethylene sulfonic acid, allyl sulfonic acid and methallyl sulfonic acid and their salts, alkyl vinyl ethers, vinylketones, N-vinylpyrrolidone, vinyl halides and vinylidene halides. In case of such hydrolyzed copolymers of vinyl ester, those containing less than 50 % by mole, especially less than 20 % by mole, of the above-mentioned copolymerizable monomer are preferably employed.

Examples of the cellulose derivatives employed as the water-soluble protective colloid (A) in the present invention are methyl cellulose, ethyl cellulose, hydroxymethyl cellulose, hydroxypropylmethyl cellulose, hydroxybutylmethyl cellulose, hydroxyethyl cellulose, carboxymethyl cellulose, aminomethylhydroxypropyl cellulose and aminoethylhyroxypropyl cellulose.

The water-soluble protective colloids (A) other than the above-mentioned, employed in the present invention, are starch, tragacanth, pectin, glue, alginic acid and its salts, gelatin, polyvinyl pyrrolidone, polyacrylic and polymethacrylic acids, their alkali metal salts and ammonium salts, polyacrylic and polymethacrylic amides, copolymers of vinyl acetate and an unsaturated carboxylic acid such as maleic acid, maleic anhydride, acrylic acid, methacrylic acid, itaconic acid, fumaric acid or crotonic acid, copolymers of styrene and the above-mentioned unsaturated carboxylic acids, copolymers of vinyl ethers and the abovementioned unsaturated carboxylic acids, and the salts and esterification products of the above-mentioned copolymers.

In the present invention, it is necessary to employ as the component (B) a carbonyl group-containing polyvinyl alcohol.

The content of the carbonyl group may be measured by means of several methods, but the content according to the absorbance of the aqueous solution at a wavelength of 280 mµ is employed in the present invention, since the method is simple and reliable.

The carbonyl group-containing polyvinyl alcohol should have not less than 0.18 in the absorbance of a 0.1 % by weight aqueous solution thereof at a wavelength of 280 mµ. (The value 0.18 of the absorbance corresponds to the carbonyl group content of 0.1 % by mole.) When the absorbance is less than 0.18, the porosity of the particle of vinyl chloride resins becomes low. The carbonyl group-containing polyvinyl alcohol showing the absorbance of not less than 0.4 is more preferable, since the porosity of the particle of vinyl chloride resins become high and uniform remarkably. (The value 0.4 of the absorbance corresponds to the carbonyl group content of 0.2 % by mole.) It cannot be expected at all from a conventional knowledge that the remarkable effects as stated before are obtained by using high carbonyl group content polyvinyl alcohols in combination with the component (A), despite that it has been generally considered they are not suited for use as a dispersing stabilizer. Further, the component (B) should have an average degree of hydrolysis of 10 to 90 % mole, since the effect of stabilizing the dispersion is extremely low outside the range of 10 to 90 % by mole.

The carbonyl group-containing polyvinyl alcohols have a different solubility in water depending on the average degree of hydrolysis. In general, the carbonyl group-containing polyvinyl alcohols having an average degree of hydrolysis of 10 to 60 % by mole are insoluble or slightly soluble in water, and those having an average degree of hydrolysis of 60 to 90 % by mole are soluble in water. Any of them can be employed in the present invention, and the carbonyl group-containing polyvinyl alcohols having an average degree of hydrolysis of 60 to 90 % by mole are particularly preferred.

Also as the carbonyl group-containing polyvinyl alcohols, those having an average degree of polymerization of 50 to 3,000, preferably 100 to 1,500 are desirable.

The absorbance is measured by employing a 0.1 % by weight aqueous solution of the carbonyl group-containing polyvinyl alcohol. In case the component (B) is soluble in water, the water solution is prepared for the measurement, and in case the component (B) is slightly soluble or insoluble in water, the solution in a mixture of water and isopropanol (1 : 1 by weight) is prepared for the measurement.

The polyvinyl alcohols containing carbonyl group employed as the component (B) in the present invention may be prepared by heat-treating usual polyvinyl alcohols not containing carbonyl group, but usually prepared by hydrolyzing carbonyl group-containing polyvinyl esters obtained by polymerizing a vinyl ester in the presence of aldehydes or ketones. Examples of the aldehydes employed in the preparation of the component (B) are acetaldehyde, propionaldehyde, butyraldehyde, n-octyl aldehyde, 2-ethylhexyl aldehyde, n-caprinaldehyde, n-decyl aldehyde, n-undecyl aldehyde, lauric aldehyde, n-tridecyl aldehyde, cetyl aldehyde, palmitic aldehyde, stearyl aldehyde, 3-methylonyl aldehyde, 3-methylododecyl aldehyde, and benzaldehyde. Examples of the ketones employed in the preparation of the component (B) are acetone, methyl ethyl ketone, hexanone and cyclohexanone. The amount of the aldehydes or ketones is determined in accordance with the desired absorbance, in other words, the desired carbonyl group content of the component (B). In case of preparing the carbonyl group-containing polyvinyl alcohols showing the absorbance of not less than 0.18, it is desirable to employ not less than 1.5 % by weight of the aldehydes or not less than 5 % by weight of the ketones, respectively based on the weight of the vinyl ester. In case of preparing the carbonyl group-containing polyvinyl alcohols showing the absorbance of not less than 0.4, it is desirable to employ not less than 2.0 % by weight of the aldehydes or not less than 8.0 % by weight of the ketones, respectively based on the weight of the vinyl ester.

The absorption at 280 mµ is assigned to

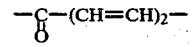

structure in the molecule of the carbonyl group-containing polyvinyl alcohol, and the atomic group is produced by the decarboxylation of the vinyl ester residue, or by the dehydration of the hydroxyl group. In the present invention, there are also usable the carbonyl group-containing polyvinyl alcohols showing the absorption at 320 mµ in addition to the absorption at 280 mµ. The absorption at 320 mµ is assigned

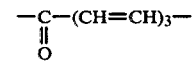

structure which is produced when the abovementioned decarboxylation or dehydration highly proceeds, for instance, by a heat treatment. The absorbance at 320 mµ may be any value, so far as the absorbance at 280 mµ is not less than 0.18, preferably not less than 0.4. In general, there are employed such heat-treated polyvinyl alcohols as the absorbance at 280 mµ of the 0.1 % by weight aqueous solution is not less than 0.18 and the ratio of the absorbance at 320 mµ to the absorbance at 280 mµ falls within the range of 0.25 to 1.00. As stated above, however, the carbonyl group-containing polyvinyl alcohols employed in the present invention are not limited by the value of the absorbance at 320 mµ, so far as the absorbance at 280 mµ falls within the above-mentioned range.

The proportion of the components (A) and (B) is not particularly limited, and they are mixed and employed in all proportions. The component (A) is usually employed in an amount of 5 to 95 % by weight based on the total weight of the components (A) and (B). Outside this range, the before-mentioned effects cannot be sufficiently exhibited. The preferred amount of the component (A) varies depending on the solubility in water of the component (B). That is to say, when the component (B) is the water-soluble carbonyl group-containing polyvinyl alcohol having an average degree of hydrolysis of more than 60 % by mole, the amount of the component (A) is selected from 10 to 80 % by weight. When the component (B) is the water-insoluble or slightly water-soluble carbonyl group-containing polyvinyl alcohol having an average degree of hydrolysis of less than 60 % by mole, the amount of the component (A) is selected from 50 to 90 % by weight.

The dispersing stabilizer of the present invention is prepared by merely admixing the components (A) and (B).

When polyvinyl alcohols are employed as the component (A) and the average degrees of hydrolysis of both components (A) and (B) are close, the stabilizer of the present invention can also be prepared by various methods as follows: For instance, there is applicable a method where at an early stage of the polymerization of a vinyl ester, the polymerization is conducted in the absence of an aldehyde or ketone, and in the course of the polymerization, an aldehyde or ketone is added to the system and the polymerization is continued to give a polyvinyl ester which is then hydrolyzed, or a method where in an arbitrary manner such as a batchwise or multistage polymerization manner, a vinyl ester is polymerized in the presence of an aldehyde or ketone and also a vinyl ester is separately polymerized in the absence of an aldehyde or ketone, and then the obtained both polyvinyl esters are blended and hydrolyzed. The thus prepared dispersing stabilizer contains polyvinyl alcohol substantially not containing carbonyl group and polyvinyl alcohol containing carbonyl group, namely the both components (A) and (B).

In the preparation of the carbonyl group-containing polyvinyl alcohols employed as the component (B), a vinyl ester is not only singly polymerized, but also polymerized with a monomer copolymerizable with the vinyl ester. Examples of the monomer copolymerizable with the vinyl ester employed in the preparation of the component (B) are olefins such as ethylene, propylene, isobuthylene, α-octene, α-dodecene and α-octadecene, unsaturated carboxylic acids, their salts and their alkyl esters such as acrylic acid, methacrylic acid, crotonic acid and maleic acid, nitriles such as acrylonitrile and methacrylontrile, amides such as acrylic amide and methacrylic amide, olefinic sulfonic acids and their salts such as ethylene sulfonic acid, allyl sulfonic acid and methallyl sulfonic acid, alkyl vinyl ethers, vinylketones, N-vinylpyrrolidone, vinyl halides and vinylidene halides. It is desirable that the content of these monomers in the obtained copolymers is less than 50 % by mole, particularly less than 20 % by mole.

In the present invention, the component (A) may be employed in admixture of different kinds of the water-soluble protective colloid such as polyvinyl alcohol-methyl cellulose mixture. Further, polyvinyl alcohols employed preferably as the component (A) may be a mixture of those having a different average degree of hydrolysis and average degree of polymerization. The carbonyl group-containing polyvinyl alcohols (B) may also be employed in the form of a mixture of those having a different carbonyl group content, average degree of hydrolysis and average degree of polymerization.

In the suspension polymerization of vinyl chloride employing the dispersing stabilizer of the present invention, usually the dispersing stabilizer is added to a water medium, and vinyl chloride is dispersed in the medium and the polymerization is then conducted in the presence of an oil-soluble catalyst. The addition of the dispersing stabilizer may be done at once at an early stage of the polymerization or in parts in the course of the polymerization. The dispersing stabilizer of the invention may be added to a water medium in the form of powder or in the form of a solution in water, an organic solvent such as an alcohol, ketone or ester or a mixed solvent of water with the organic solvent.

The dispersing stabilizer of the present invention is employed in an amount of 0.01 to 5 % by weight, preferably 0.01 to 3 % by weight, based on the weight of vinyl chloride.

In the suspension polymerization, there are usable any oil-soluble catalysts such as benzoyl peroxide, lauroyl peroxide, diisopropyl peroxydicarbonate, α, α'-azobisisobutyronitrile, α, α'-azobis-2,4-dimethylvaleronitrile and acetylcyclohexylsulfonyl peroxide. These catalysts may be employed singly or in admixture thereof.

The polymerization temperature is selected from 30° to 70° C. Various surface active agents and inorganic dispersing agents may also be suitably employed as an auxiliary agent in the suspension polymerization.

The dispersing stabilizer of the present invention is applicable not only to the preparation of homopolymer of vinyl chloride, but also to the preparation of copolymers of vinyl chloride and a monomer copolymerizable therewith such as vinylidene halides, vinyl ethers, vinyl benzoate, acrylic and methacrylic acids, acrylic and methacrylic esters, maleic acid, maleic anhydride, or styrene.

Although the suspension polymerization using the dispersing stabilizer of the invention has been described with respect to the preparation of polyvinyl chloride and its copolymers, the dispersing stabilizer of the invention is not necessarily limited to the use of the suspension polymerization of vinyl chloride and is applicable to the suspension polymerization of other vinyl compounds such as styrene, acrylates, methacrylates, and vinyl acetate.

The present invention is more particularly described and explained by means of the following Examples, in which all % and parts are by weight unless otherwise noted.

EXAMPLE 1

(a) Preparation of Component (B)

A polymerization vessel was charged with 1,200 parts of vinyl acetate, 56 parts of methanol and 39.6 parts of acetaldehyde, and polymerization was carried out for 6 hours at a temperature of 56° C. to 58° C. by employing azobisisobutyronitrile as a polymerization catalyst so that the polymerization was stopped when it proceeded by 75 %. Unreacted vinyl acetate and acetaldehyde were removed by blowing methanol vapor into the vessel to give a methanol solution of polyvinyl acetate.

The thus prepared polyvinyl acetate was then hydrolyzed to give polyvinyl having a degree of hydrolysis of 70.1 % by mole and a degree of polymerization of 350. The absorbance of a 0.1 % water solution of the obtained polyvinyl alcohol was 1.07 at a wavelength of 280 m$\mu$.

(b) Suspension Polymerization of Vinyl Chloride

A 100 liter stainless steel autoclave equipped with a stirrer was charged with 100 parts of vinyl chloride, 200 parts of water, 0.05 part of the above-mentioned component (B), 0.05 part of partially hydrolyzed polyvinyl alcohol having a degree of hydrolysis of 71.5 % by mole and a degree of polymerization of 1,000 as a component (A), and 0.2 part of lauroyl peroxide as a polymerization catalyst. Suspension polymerization was then carried out at 60° C. with agitation at 400 r.p.m.

The result is shown in Table 1.

EXAMPLE 2

(a) Preparation of Component (B)

A polymerization vessel was charged with 1,200 parts of vinyl acetate and 20 parts of propionaldehyde, and bulk polymerization was carried out by employing azobisisobutyronitrile as a polymerization catalyst. The obtained polyvinyl acetate was then hydrolyzed to give polyvinyl alcohol having a degree of hydrolysis of 71.5 % by mole and a degree of polymerization of 550. The absorbance at 280 m$\mu$ of a 0.1 % water solution of the obtained polyvinyl alcohol was 0.50.

(b) Suspension Polymerization of Vinyl Chloride

Suspension polymerization of vinyl chloride was carried out in the same manner as in Example 1 except that the polyvinyl alcohol prepared in this Example (component B) and a partially hydrolyzed polyvinyl alcohol having a degree of hydrolysis of 74.5 % by mole and a degree of polymerization of 850 (component A) were employed as the dispersing stabilizer.

The result is shown in Table 1.

EXAMPLES 3 to 7

Suspension polymerization of vinyl chloride was carried out in the same manner as in Example 1 except that a dispersing stabilizer as shown in Table 1 was employed, consisting of (A) polyvinyl alcohol and (B) a carbonyl group-consisting polyvinyl alcohol prepared in the same manner as in Example 1.

The results are shown in Table 1.

Table 1

| | Dispersing Stabilizer | | | | | | |
|---|---|---|---|---|---|---|---|
| | Component A (polyvinyl alcohol) | | | Component B | | | |
| Example No. | Degree of hydrolysis % by mole | Degree of polymerization — | Proportion % | Degree of hydrolysis % by mole | Degree of polymerization — | Absorbance at 280 m$\mu$ — | Proportion % |
| 1 | 71.5 | 1,000 | 50 | 70.1 | 350 | 1.07 | 50 |
| 2 | 74.5 | 850 | 50 | 71.5 | 550 | 0.50 | 50 |
| 3 | 72.2 | 680 | 70 | 68.8 | 200 | 2.15 | 30 |
| 4 | 80.2 | 2,500 | 60 | 68.9 | 310 | 1.15 | 40 |
| 5 | 80.2 | 2,500 | 30 | 73.5 | 830 | 0.30 | 70 |
| 6 | 80.2 | 2,500 | 10 | 68.5 | 180 | 2.31 | 30 |
| | | | | 72.3 | 650 | 0.44 | 60 |
| 7 | 70.1 | 700 | 50 | 69.2 | 200 | 2.15 | 30 |
| | 80.2 | 2,500 | 20 | | | | |
| Control 1* | — | — | (0) | 74.8 | 850 | 0.28 | (100) |
| Control 2* | 80.2 | 2,500 | (100) | — | — | — | (0) |

| | Results | | | | | | | |
|---|---|---|---|---|---|---|---|---|
| | Particle size distribution of PVC** | | | | | Properties of PVC** | | |
| Example No. | <105$\mu$ | 105–149$\mu$ | 149–177$\mu$ | 177–210$\mu$ | >210$\mu$ | Porosity cc./g. | Uniformity of porosity | Plasticizer absorptivity | Adhesion of scale |
| | % | | | | | | — | — | — |
| 1 | 2 | 40 | 38 | 18 | 2 | 0.35 | A | A | none |
| 2 | 1 | 35 | 40 | 23 | 1 | 0.34 | A | A-B | none |
| 3 | 7 | 50 | 21 | 20 | 2 | 0.37 | A | A | none |
| 4 | 10 | 55 | 20 | 12 | 3 | 0.37 | A | A | none |
| 5 | 3 | 40 | 30 | 23 | 4 | 0.33 | A | B | none |
| 6 | 9 | 60 | 15 | 15 | 1 | 0.38 | A | A | none |
| 7 | 6 | 83 | 10 | 10 | 1 | 0.39 | A | A | none |
| Control 1* | 5 | 40 | 25 | 25 | 5 | 0.31 | A | B-C | a little |
| Control 2* | 12 | 60 | 18 | 9 | 1 | 0.27 | B | B-C | none |

*In Control 1, component (B) was used alone in an amount of 0.10 part as a dispersing stabilizer.
In Control 2, component (A) was used alone in an amount of 0.10 part as a dispersing stabilizer.
**PVC: Polyvinyl chloride (Note)
1. The porosity was measured by employing a mercury porosity meter.
2. The uniformity of the porosity was evaluated as follows: A mineral oil was absorbed into polyvinyl chloride particles. The particles were placed on a slide glass, and were lighted from under. The number of opaque particles among 100 particles was then counted under a microscope. Since the particles having a large porosity were transparent and were pervious to light, the uniformity of the porosity was evaluated by the number of the opaque particles according to the following classification.

A: 0 to 5 particle
B: 5 to 10 particles
C: more than 10 particles

3. The plasticizer absorptivity was evaluated by dry up time of a mixture of 6 parts of polyvinyl chloride and 4 parts of dioctyl phthalate, which was measured by employing a Brabender, according to the following classification.

A: within 3 minutes
B: 3 to 5 minutes
C: 5 to 10 minutes

EXAMPLE 8

(a) Preparation of Component (B)

A polymerization vessel was charged with 1,200 parts of vinyl acetate, 56 parts of methanol and 39.6 parts of acetaldehyde, and polymerization was carried out for 6 hours at a temperature of 56° to 58° C. by employing azobisisobutyronitrile as a polymerization catalyst so that the polymerization was stopped when it proceeded by 75 %. Unreacted vinyl acetate and acetaldehyde were removed by blowing methanol vapor into the vessel to give a methaol solution of polyvinyl acetate.

The thus prepared polyvinyl acetate was then hydrolyzed to give polyvinyl alcohol having a degree of hydrolysis of 50 % by mole and a degree of polymerization of 350. The absorbance at 280 mµ of a 0.1 % solution of the obtained polyvinyl alcohol in a water-isopropanol mixed solvent (1:1 by weight) was 1.07.

(b) Suspension Polymerization of Vinyl Chloride

A 100 liter stainless steel autoclave equipped with a stirrer was charged with 100 parts of vinyl chloride, 200 parts of water, 0.03 part of the above-mentioned component (B), 0.07 part of partially hydrolyzed polyvinyl alcohol having a degree of hydrolysis of 80.2 % by mole and a degree of polymerization of 2,500 as a component (A), and 0.2 part of lauroyl peroxide as a polymerization catalyst. Suspension polymerization was then carried out at 60° C. with agitation at 400 r.p.m.

The result is shown in Table 2.

EXAMPLE 9

(a) Preparation of Component (B)

A polymerization vessel was charged with 1,200 parts of vinyl acetate and 20 parts of propionaldehyde, and bulk polymerization was carried out by employing azobisisobutyronitrile as a polymerization catalyst. The thus prepared polyvinyl acetate was then hydrolyzed to give polyvinyl alcohol having a degree of hydrolysis of 35% by mole and a degree of polymerization of 550. The absorbance at 280 mµ of a 0.1 % solution of the obtained polyvinyl alcohol in a water-isopropanol mixed solvent (1:1 by weight) was 0.50.

(b) Suspension Polymerization of Vinyl Chloride

Suspension polymerization of vinyl chloride was carried out in the same manner as in Example 8 except that the polyvinyl alcohol prepared in this Example [component (B)] and a partially hydrolyzed polyvinyl alcohol having a degree of hydrolysis of 74.5% by mole and a degree of polymerization of 850 [component (A)] were employed as the dispersing stabilizer.

The result is shown in Table 2.

EXAMPLES 10 to 14

Suspension polymerization of vinyl chloride was carried out in the same manner as in Example 8 except that a dispersing stabilizer as shown in Table 2 was employed, consisting of (A) polyvinyl alcohol and (B) a carbonyl group-containing polyvinyl alcohol prepared in the same manner as in Example 8.

The results are shown in Table 2.

Table 2

| | Dispersing Stabilizer | | | | | | |
|---|---|---|---|---|---|---|---|
| | Component A (polyvinyl alcohol) | | | Component B | | | |
| Example No. | Degree of hydrolysis % by mole | Degree of polymerization — | Proportion % | Degree of hydrolysis % by mole | Degree of polymerization — | Absorbance at 280 mµ — | Proportion % |
| 8 | 80.2 | 2,500 | 70 | 50.1 | 350 | 1.07 | 30 |
| 9 | 74.5 | 850 | 70 | 35.3 | 550 | 0.50 | 30 |
| 10 | 88.4 | 2,200 | 50 | 45.5 | 200 | 2.15 | 50 |
| 11 | 79.5 | 1,200 | 60 | 30.9 | 310 | 1.15 | 40 |
| 12 | 80.2 | 2,500 | 50 | 74.8 | 850 | 0.28 | 20 |
| 12 | 80.2 | 2,500 | 50 | 40.3 | 200 | 2.15 | 30 |
| 13 | 70.8 | 600 | 40 | 37.5 | 350 | 1.07 | 40 |
| | 80.2 | 2,500 | 20 | | | | |
| 14 | 80.2 | 2,500 | 80 | 21.7 | 180 | 2.31 | 20 |

| | Results | | | | | | | |
|---|---|---|---|---|---|---|---|---|
| | Particle size distribution of PVC** | | | | | Properties of PVC** | | |
| Example No. | <105µ | 105-149µ | 149-177∞ | 177-210µ | >210µ | Porosity | Uniformity of porosity | Plasticizer absorptivity | Adhesion of scale |
| | % | | | | | cc./g. | — | — | — |
| 8 | 5 | 55 | 25 | 14 | 1 | 0.36 | A | A | none |
| 8 | 5 | 55 | 25 | 14 | 1 | 0.36 | A | A | none |
| 9 | 2 | 37 | 33 | 27 | 1 | 0.34 | A | A-B | none |
| 10 | 1 | 20 | 40 | 35 | 4 | 0.33 | A | B | none |
| 11 | 3 | 41 | 30 | 23 | 3 | 0.37 | A | A | none |
| 12 | 4 | 50 | 24 | 20 | 2 | 0.38 | A | A | none |
| 13 | 2 | 43 | 31 | 23 | 1 | 0.39 | A | A | none |

Table 2-continued

| 14 | 6 | 53 | 31 | 9 | 1 | 0.33 | A | A-B | none |

**PVC: Polyvinyl chloride

EXAMPLES 15 to 20

Suspension polymerization of vinyl chloride was carried out under the conditions as shown in Table 3 according to the procedure of Example 1.

The results are shown in Table 3.

Table 3

| | Dispersing Stabilizer | | | | | | |
|---|---|---|---|---|---|---|---|
| | Water-soluble protective colloid A | | | Component B | | | |
| Example No. | Kind | Proportion % | Degree of hydrolysis % by mole | Degree of polymerization | absorbance at 280 mµ | Proportion % |
| 15 | Hydroxypropylmethyl cellulose | 50 | 70.1 | 350 | 1.07 | 50 |
| 16 | Hydroxypropylmethyl cellulose | 70 | 50.1 | 350 | 1.07 | 30 |
| 17 | Methyl cellulose | 50 | 71.5 | 550 | 0.50 | 50 |
| 18 | Methyl cellulose | 80 | 35.3 | 550 | 0.50 | 20 |
| 19 | Carboxymethyl cellulose | 50 | 68.9 | 310 | 1.15 | 50 |
| 20 | Gelatin | 50 | 73.5 | 830 | 0.30 | 50 |

| | Particle size distribution of PVC** | Results | | | |
|---|---|---|---|---|---|
| | | | Properties of PVC** | | |
| Example No. | Proportion of particles having a particle size of more than 210 mµ % | Porosity cc./g. | Uniformity of porosity | Plasticizer absorptivity | Adhesion of scale |
| 15 | 7 | 0.35 | A-B | B | none |
| 16 | 5 | 0.34 | A-B | B | none |
| 17 | 3 | 0.32 | A-B | B | none |
| 18 | 3 | 0.32 | A-B | B | none |
| 19 | 9 | 0.34 | A-B | B | none |
| 20 | 10 | 0.31 | B | B-C | none |

**PVC: Polyvinyl chloride

EXAMPLES 21 to 27

Suspension polymerization of vinyl chloride was carried out according to the procedure of Example 1 by employing a dispersing stabilizer as shown in Table 4, the component (B) of which was a partially hydrolyzed carbonyl group-containing polyvinyl alcohol subjected to the heat treatment.

The results are shown in Table 4.

Table 4

| | Dispersing Stabilizer | | | | | | | |
|---|---|---|---|---|---|---|---|---|
| | Component A | | | Component B | | | | |
| Example No. | Degree of hydrolysis % by mole | Degree of polymerization — | Proportion % | Degree of hydrolysis % by mole | Degree of polymerization — | Absorbance at 280 mµ — | Ratio of absorbances*** — | Proportion % |
| 21 | 71.5 | 1,000 | 50 | 70.1 | 350 | 1.01 | 0.50 | 50 |
| 22 | 74.5 | 850 | 50 | 71.5 | 550 | 0.45 | 0.74 | 50 |
| 23 | 80.2 | 2,500 | 60 | 68.9 | 310 | 1.10 | 0.62 | 40 |
| 24 | 80.2 | 2,500 | 30 | 73.5 | 830 | 0.25 | 0.68 | 70 |
| 25 | 70.1 | 700 | 50 | 69.2 | 200 | 1.85 | 0.45 | 30 |
| | | | | 80.2 | 2,500 | 20 | | |
| 26 | 80.2 | 2,500 | 70 | 50.1 | 350 | 0.99 | 0.55 | 30 |
| 27 | 70.8 | 600 | 40 | 37.5 | 350 | 0.95 | 0.75 | 40 |
| | | | | 80.2 | 2,500 | 20 | | |

| | Particle size distribution of PVC** | | | | | Results | | | |
|---|---|---|---|---|---|---|---|---|---|
| | | | | | | | Properties of PVC** | | |
| Example No. | <105µ | 105–149µ | 149–177µ | 177–210µ | >210µ | Porosity cc./g. | Uniformity of porosity | Plasticizer absorptivity | Adhesion of scale |
| | % | | | | | | | | |
| 21 | 8 | 48 | 34 | 10 | 0 | 0.38 | A | A | none |
| 22 | 5 | 40 | 40 | 15 | 0 | 0.34 | A | A | none |
| 23 | 10 | 69 | 15 | 6 | 0 | 0.37 | A | A | none |
| 24 | 4 | 43 | 31 | 20 | 2 | 0.34 | A | A | none |
| 25 | 15 | 75 | 5 | 5 | 0 | 0.40 | A | A | none |
| 26 | 4 | 57 | 26 | 12 | 1 | 0.36 | A | A | none |
| 27 | 3 | 44 | 33 | 19 | 1 | 0.39 | A | A | none |

**PVC: Polyvinyl chloride
***Ratio of absorbance at 320 mµ to absorbance at 280µ

What we claim is:

1. A dispersing stabilizer for suspension homopolymerization or copolymerization of vinyl chloride consisting essentially of (A) a water-soluble protective colloid and (B) a carbonyl group-containing polyvinyl alcohol having an average degree of hydrolysis of 10 to 90% by mole; the absorbance of a 0.1% by weight aqueous solution of said carbonyl group-containing polyvinyl alcohol being not less than 0.18 at a wavelength of 280 mμ.

2. The dispersing stabilizer of claim 1, wherein said water-soluble protective colloid is polyvinyl alcohol having an average degree of hydrolysis of 60 to 95% by mole and a degree of polymerization of 100 to 3,000.

3. The dispersing stabilizer of claim 1, wherein said carbonyl group-containing polyvinyl alcohol is one showing the absorbance of not less than 0.4.

4. The dispersing stabilizer of claim 1, wherein said carbonyl group-containing polyvinyl alcohol is one showing the absorbance of not less than 0.4 and having an average degree of hydrolysis of 60 to 90% by mole.

5. The dispersing stabilizer of claim 1, wherein said water-soluble protective colloid is employed in an amount of 5 to 95% by weight based on the total weight of the dispersing stabilizer.

6. The dispersing stabilizer of claim 1, wherein the stabilizer is employed for suspension polymerization of vinyl chloride.

* * * * *